US012567913B1

(12) United States Patent
Silverman et al.

(10) Patent No.: US 12,567,913 B1
(45) Date of Patent: Mar. 3, 2026

(54) SPECTRAL ANALYSIS FOR NON-Wi-Fi INTERFERENCE CLASSIFICATION

(71) Applicant: Cisco Technology, Inc., San Jose, CA (US)

(72) Inventors: Matthew Aaron Silverman, Shaker Heights, OH (US); Michael Barry DeLong, Macedonia, OH (US); Ashish Sheikh, Akron, OH (US); Audrey Yazdanparast, Richfield, OH (US); Mohsen Jamalabdollahi, Akron, OH (US)

(73) Assignee: Cisco Technology, Inc.

( * ) Notice: Subject to any disclaimer, the term of this patent is extended or adjusted under 35 U.S.C. 154(b) by 402 days.

(21) Appl. No.: 18/171,730

(22) Filed: Feb. 21, 2023

(51) Int. Cl.
*H04B 17/345* (2015.01)
*H04B 17/391* (2015.01)

(52) U.S. Cl.
CPC ....... *H04B 17/345* (2015.01); *H04B 17/3913* (2015.01)

(58) Field of Classification Search
CPC .......................... H04B 17/345; H04B 17/3913
See application file for complete search history.

(56) References Cited

U.S. PATENT DOCUMENTS

| | | | |
|---|---|---|---|
| 2013/0121177 A1* | 5/2013 | Morton | H04L 43/0823 370/252 |
| 2014/0009333 A1 | 1/2014 | Ahmed et al. | |
| 2018/0324595 A1 | 11/2018 | Shima | |
| 2019/0011989 A1* | 1/2019 | Schwesig | G01S 13/66 |
| 2020/0151554 A1 | 5/2020 | Siraj et al. | |
| 2021/0288731 A1 | 9/2021 | Yun et al. | |
| 2021/0334626 A1 | 10/2021 | Hang et al. | |

OTHER PUBLICATIONS

Rayanchu, Shravan et al. "Airshark: Detecting Non-Wifi RF Devices using Commodity WiFi Hardware" IMC'11, Nov. 2-4, 2011, Berlin, Germany; https://pages.cs.wisec.edu/; (17 pages).

* cited by examiner

*Primary Examiner* — Natasha W Cosme
(74) *Attorney, Agent, or Firm* — Merchant & Gould P.C.

(57) ABSTRACT

Classification of non-Wi-Fi interference may be provided. A computing device may receive spectrogram data. Next, time domain and frequency domain edges of a plurality of pulses in the spectrogram data may be identified. Wireless pulses may be removed from the spectrogram data. Metrics may then be extracted from the plurality of pulses in the spectrogram data with the wireless pulses removed. A Machine Learning (ML) model may be used to determine an interferer type based upon the metrics.

20 Claims, 4 Drawing Sheets

SPECTRAL ANALYSIS FOR NON-Wi-Fi INTERFERENCE CLASSIFICATION

TECHNICAL FIELD

The present disclosure relates generally to providing classification of non-Wi-Fi interference.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
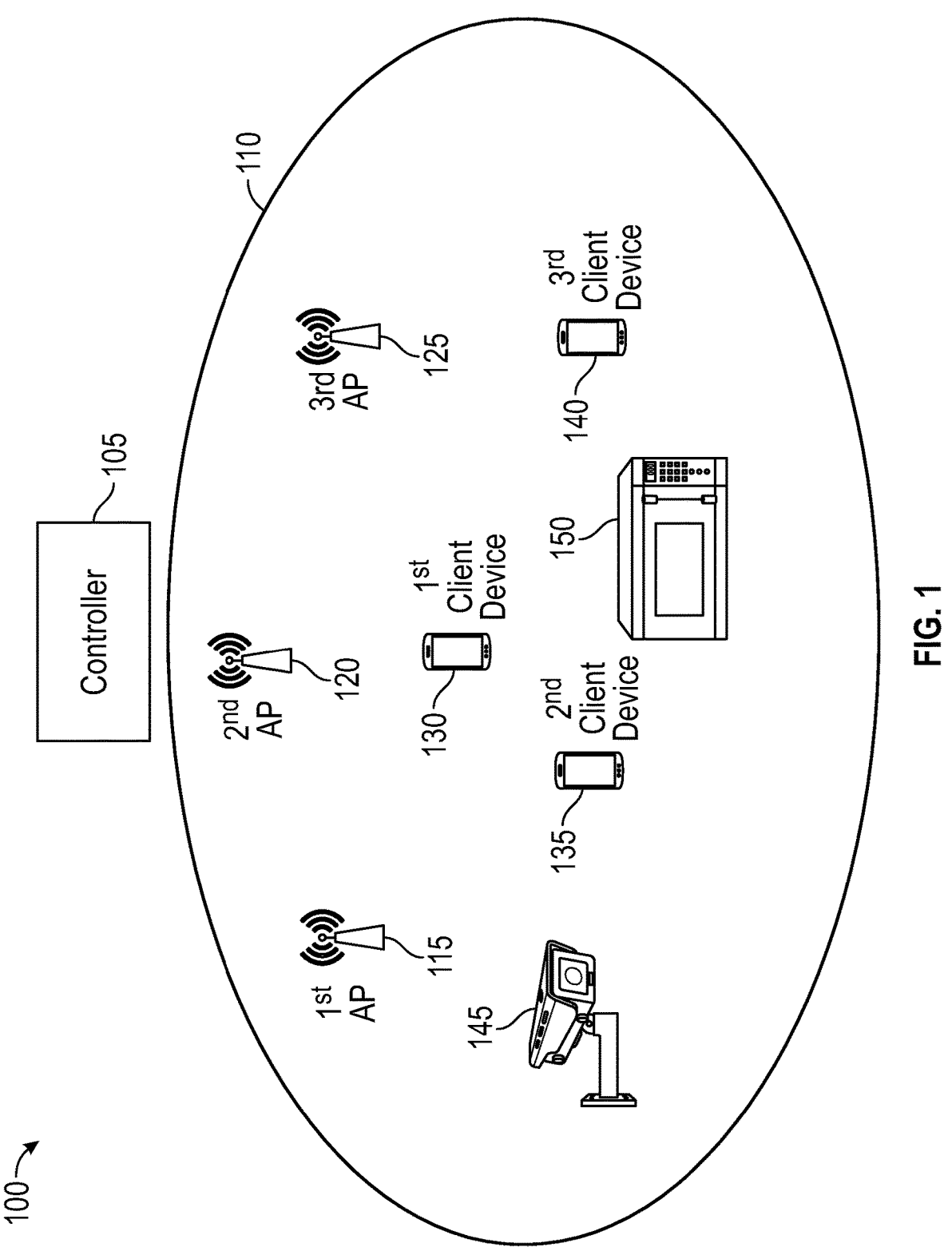
FIG. 1 is a block diagram of an operating environment for providing classification of non-Wi-Fi interference.

Classification of non-Wi-Fi interference may be provided. A computing device may receive spectrogram data. Next, time domain and frequency domain edges of a plurality of pulses in the spectrogram data may be identified. Wireless pulses may be removed from the spectrogram data. Metrics may then be extracted from the plurality of pulses in the spectrogram data with the wireless pulses removed. A Machine Learning (ML) model may be used to determine an interferer type based upon the metrics.

Both the foregoing overview and the following example embodiments are examples and explanatory only and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Spectral analysis studies the frequency spectrum contained in discrete, uniformly sampled data. The Fourier transform is a tool that reveals frequency components of a time-based or space-based signal by representing it in the frequency space. A spectrogram may comprise a visual representation of the spectrum of frequencies of a signal as it varies with time. A spectrogram may be generated by an optical spectrometer, a bank of band-pass filters, by Fourier transform, or by a wavelet transform.

One problem with wireless (e.g., Wi-Fi) networks is that other devices may produce interfering signals (i.e., interference) in the frequency channels used by the wireless network. For example, a microwave oven or a wireless camera may produce interference. The interference produced by the microwave oven may be different from the interference produced by the wireless camera. Accordingly, embodiments of the disclosure may process data from spectrograms to identify non-Wi-Fi interferers and classify what type of device (e.g., a microwave oven verses a wireless camera) is producing the interference.

FIG. 1 shows an operating environment 100 providing classification of non-Wi-Fi interference. As shown in FIG. 1, operating environment 100 may comprise a controller 105 and a coverage environment 110. Coverage environment 110 may comprise, but is not limited to, a Wireless Local Area Network (WLAN) comprising a plurality of Access Points (APs) that may provide wireless network access (e.g., access to the WLAN for client devices). The plurality of APs may comprise a first AP 115, a second AP 120, a third AP 125. The plurality of APs may provide wireless network access to a plurality of client devices as they move within coverage environment 110. The plurality of client devices may comprise, but are not limited to, a first client device 130, a second client device 135, and a third client device 140. Ones of the plurality of client devices may comprise, but are not limited to, a smart phone, a personal computer, a tablet device, a mobile device, a telephone, a remote control device, a set-top box, a digital video recorder, an Internet-of-Things (IOT) device, a network computer, a router, Virtual Reality (VR)/Augmented Reality (AR) devices, or other similar microcomputer-based device. Each of the plurality of APs may be compatible with specification standards such as, but not limited to, the Institute of Electrical and Electronics Engineers (IEEE) 802.11 specification standard for example.

The plurality of APs and the plurality of client devices may use Multi Link Operation (MLO) where they simultaneously transmit and receive across different bands and channels by establishing two or more links to two or more AP radios. These bands may comprise, but are not limited the 2 GHz band, the 5 GHz band, the 6 GHz band, and the 60 GHz band.

Coverage environment 110 may also include other types of devices. These other devices may comprise, but are not limited to a wireless camera 145 and a microwave over 150. These other devices may produce signals in coverage environment 110 that may cause interference with the communication between the plurality of APs and the plurality of client devices.

Controller 105 may comprise a Wireless Local Area Network controller (WLC) and may provision and control coverage environment 110 (e.g., a WLAN). Controller 105 may allow first client device 130, second client device 135, and third client device 140 to join coverage environment 110. In some embodiments of the disclosure, controller 105 may be implemented by a Digital Network Architecture Center (DNAC) controller (i.e., a Software-Defined Network (SDN) controller) that may configure information for coverage environment 110 in order to provide classification of non-Wi-Fi interference.

The elements described above of operating environment 100 (e.g., controller 105, first AP 115, second AP 120, third AP 125, first client device 130, second client device 135, or third client device 140) may be practiced in hardware and/or in software (including firmware, resident software, microcode, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 4, the elements of operating environment 100 may be practiced in a computing device 400.

Figure 2:
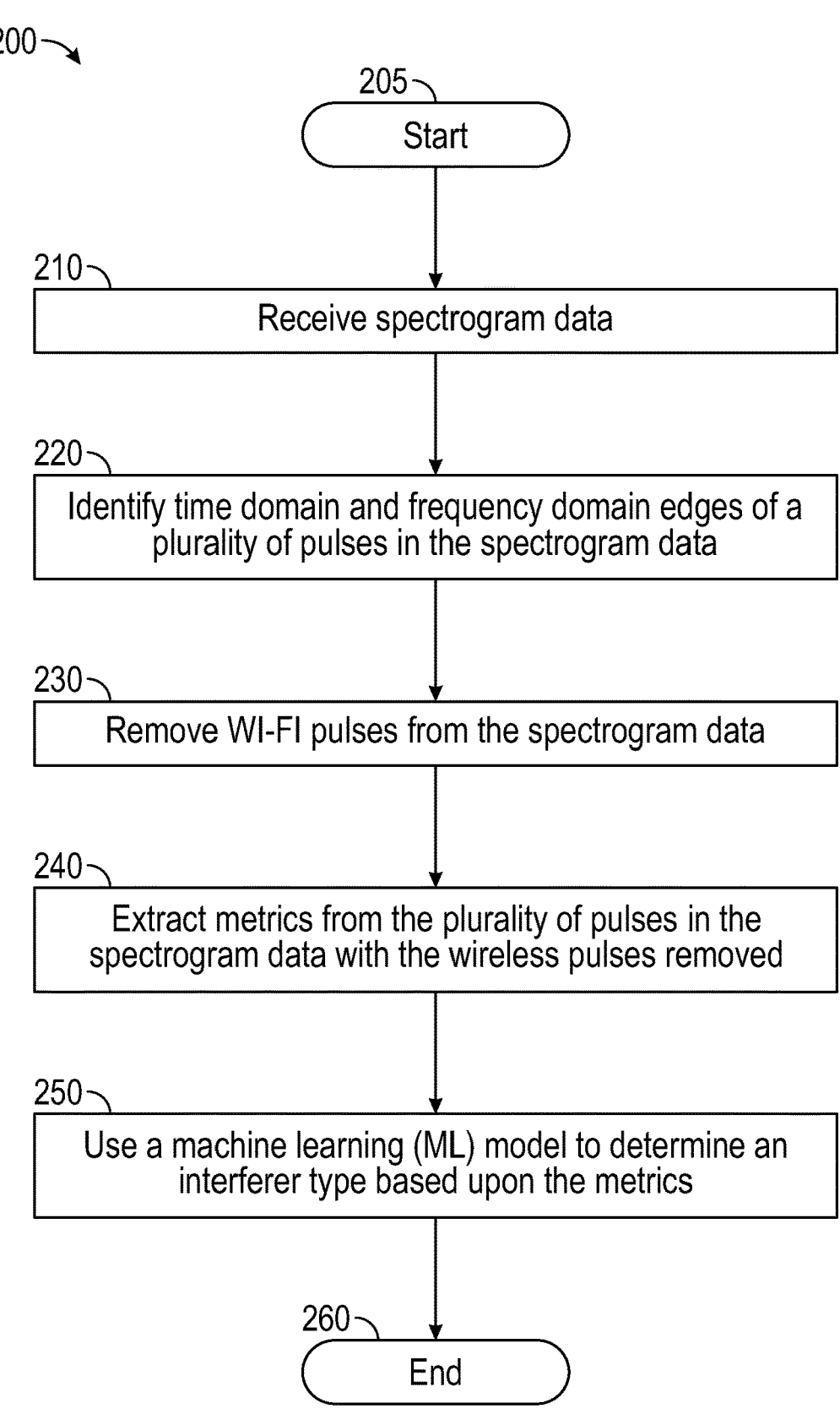
FIG. 2 is a flow chart of a method for providing classification of non-Wi-Fi interference.

FIG. 2 is a flow chart setting forth the general stages involved in a method 200 consistent with embodiments of the disclosure providing classification of non-Wi-Fi interference. Method 200 may be implemented using computing device 400 as described in more detail below with respect to FIG. 4. Ways to implement the stages of method 200 will be described in greater detail below.

Figures 3A, 3B, 3C, 3D:
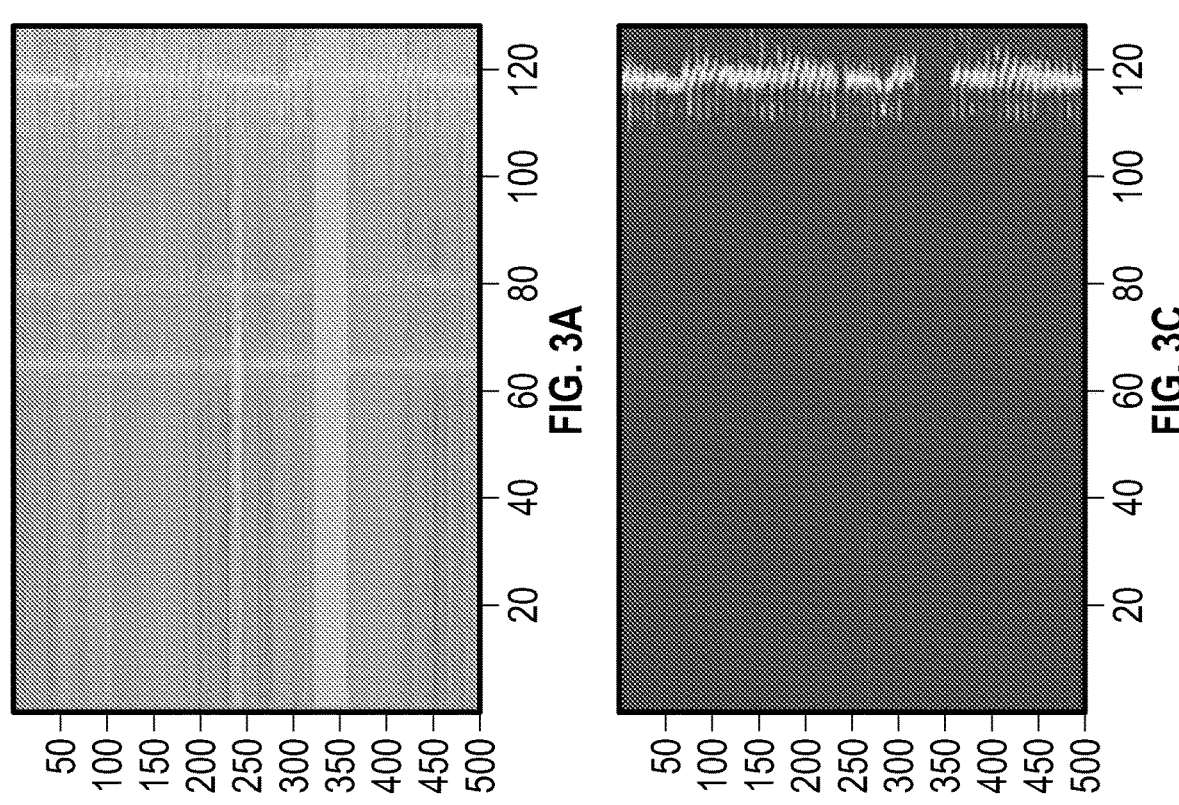
FIGS. 3A, 3B, 3C, and 3D illustrate spectrogram captures.

Method 200 may begin at starting block 205 and proceed to stage 210 where computing device 400 may receive spectrogram data. For example, FIG. 3A shows a raw spectrogram of a type 1 2.4 GHz camera (e.g., wireless camera 145) and Wi-Fi in coverage environment 110. Computing device 400 may receive spectrogram data associated with the spectrogram of FIG. 3A.

From stage 210, computing device 400 receives the spectrogram data, method 200 may advance to stage 220 where computing device 400 may identify time domain and frequency domain edges of a plurality of pulses in the spectrogram data. For example, computing device 400 may operate on the received spectrogram data in order to determine where pulses are in both the time domain and the frequency domain. At this point, samples that are not a part of any pulse may be removed.

Once computing device 400 identifies time domain and frequency domain edges of the plurality of pulses in the spectrogram data in stage 220, method 200 may continue to stage 230 where computing device 400 may remove Wi-Fi pulses from the spectrogram data. At this point, anything that has the same bandwidth and duration of Wi-Fi may be removed. For example, FIG. 3B shows a spectrogram with the 2.4 GHz Wi-Fi removed in coverage environment 110 with suppression of noise. This suppression of noise may be accomplished by removing everything that is not a pulse at that stage. Computing device 400 may receive spectrogram data associated with the spectrogram of FIG. 3A and remove pules associated with the 2.4 GHz Wi-Fi from the spectrogram data. FIG. 3C shows pulse joining and removal of noise where nearby pulses are joined if the gap between them in time or frequency is small enough. At this point noise is removed by removing pulses that are too small in bandwidth or time duration (i.e., below a predetermined threshold). FIG. 3D shows pulse block identification.

After computing device 400 removes the Wi-Fi pulses from the spectrogram data in stage 230, method 200 may proceed to stage 240 where computing device 400 may extract metrics from the plurality of pulses in the spectrogram data with the wireless pulses removed. For example, computing device 400 may extract metrics from isolated pulses in the spectrogram data with the wireless pulses removed as shown in FIG. 3D.

The metrics may comprise duration statistics. Duration statistics may comprise the time duration of non-Wi-Fi pulses. The metrics may comprise width statistics. Width statistics may comprise how wide in frequency the pulses are. The metrics may comprise signal gap statistics. Signal gap statistics may comprise how much dead air/gaps exist between pulses. The metrics may comprise variation in width. Variation in width may comprise what is the variation in time/frequency from pulse-to-pulse. The metrics may comprise density statistics. Density statistics may comprise how sparse the pulses are that are identified, for example, what percent of time/frequency blocks in the pulse are "illuminated" above a predetermined power threshold. The metrics may comprise cepstral statistics. Cepstral statistics may comprise what are the cepstral statistics that represent repeating patterns in frequency/time in the plurality of pulses in the spectrogram data. The metrics may comprise per pulse power statistics. Per pulse power statistics may comprise how much variation is in the power of the pulses.

From stage 240, where computing device 400 extracts the metrics from the plurality of pulses in the spectrogram data with the wireless pulses removed, method 200 may advance to stage 250 where computing device 400 may use a Machine Learning (ML) model to determine an interferer type based upon the metrics. For example, based on the extracted metrics of the pulses in any given channel, an ML model may be trained that distinguishes between different types of interferers. For example, a signal generator may be used to produce the interference associated with type 1 2.4 GHz camera, a microwave oven, or any type of interferer expected in coverage environment 110. After it is trained, the ML model may be given the metrics. In the above example (FIG. 3D), the spectrogram data was associated with a type 1 2.4 GHz camera, so the ML model may identify the interferer type as a type 1 2.4 GHz camera. This ML may comprise a nested if/else statement that checks each metric against what is expected for a particular interferer type or as complicated as a Convolutional Neural Network (CNN).

Certain interference types should persist over time and/or frequency channel. A consistency check may be used to avoid falsing on a misleading spectrogram. Examples of frequency domain consistency may comprise that a jammer device should appear on all channels in a given band. If it is seen on fewer than all channels, it may be assumed it is a false. Examples of time domain consistency may comprise that a microwave oven should run for more than 1 cycle measurement on a channel. If the microwave oven is not detected on the same channel at least N out of M times, it may be assumed it was a false. Once computing device 400 uses the ML model to determine the interferer type based upon the metrics in stage 250, method 200 may then end at stage 260.

Figure 4:
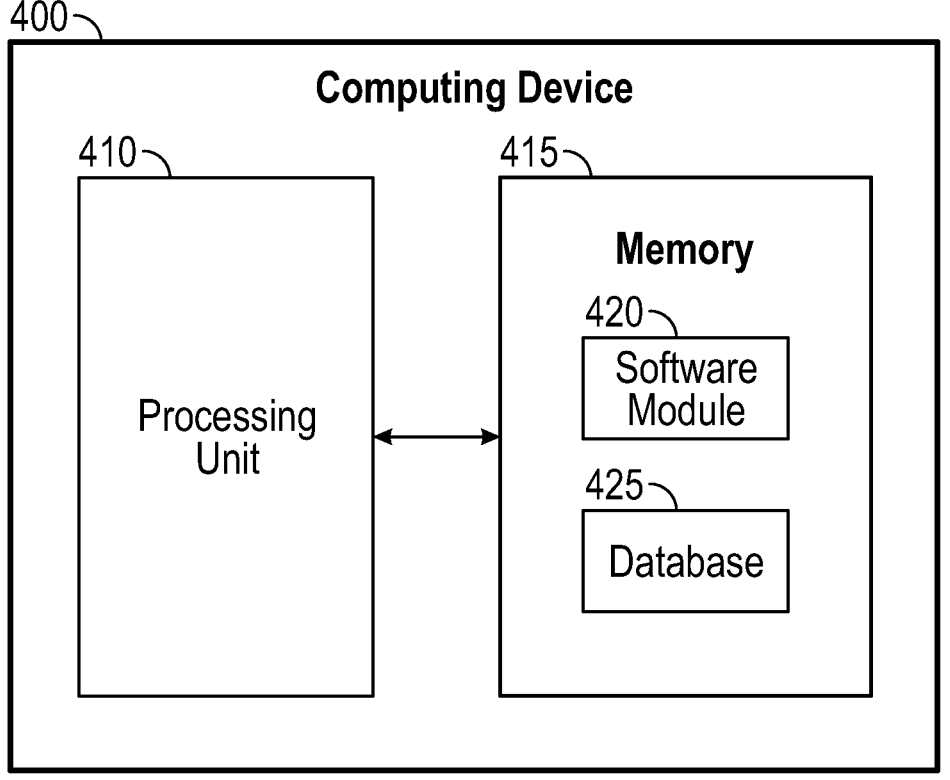
FIG. 4 is a block diagram of a computing device.

FIG. 4 shows computing device 400. As shown in FIG. 4, computing device 400 may include a processing unit 410 and a memory unit 415. Memory unit 415 may include a software module 420 and a database 425. While executing on processing unit 410, software module 420 may perform, for example, processes for providing classification of non-Wi-Fi interference as described above with respect to FIG. 2. Computing device 400, for example, may provide an operating environment for controller 105, first AP 115, second AP 120, third AP 125, first client device 130, second client device 135, or third client device 140. Controller 105, first AP 115, second AP 120, third AP 125, first client device 130, second client device 135, or third client device 140 may operate in other environments and are not limited to computing device 400.

Computing device 400 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 400 may comprise any computer operating environment, such as hand-held devices, multiprocessor systems, microprocessor-based or programmable sender electronic devices, minicomputers, mainframe computers, and the like. Computing device 400 may also be practiced in distributed computing environments where tasks are performed by remote processing devices. The aforementioned systems and devices are examples, and computing device 400 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:

receiving, by a computing device, spectrogram data;

identifying time domain and frequency domain edges of a plurality of pulses in the spectrogram data;

removing wireless pulses from the spectrogram data, wherein removing wireless pulses from the spectrum data comprises removing one or more pulses that has a bandwidth or a time duration below a predetermined threshold;

extracting metrics from the plurality of pulses in the spectrogram data with the wireless pulses removed; and using a Machine Learning (ML) model to determine an interferer type based upon the metrics.

2. The method of claim 1, wherein the metrics comprise durations of the plurality of pulses.

3. The method of claim 1, wherein the metrics comprise widths of the plurality of pulses.

4. The method of claim 1, wherein the metrics comprise lengths of gaps between the plurality of pulses.

5. The method of claim 1, wherein the metrics comprise variation in widths of the plurality of pulses.

6. The method of claim 1, wherein the metrics comprise densities of the plurality of pulses.

7. The method of claim 1, wherein the metrics comprise cepstral statistics that represent repeating patterns in the plurality of pulses in at least one of time and frequency.

8. The method of claim 1, wherein the metrics comprise variation in power levels of the plurality of pulses.

9. The method of claim 1, further comprising training the ML model.

10. A system comprising:

a memory storage; and a processing unit coupled to the memory storage, wherein the processing unit is operative to:

receive spectrogram data;

identify time domain and frequency domain edges of a plurality of pulses in the spectrogram data;

remove wireless pulses from the spectrogram data, wherein the processing unit being operative to remove the wireless pulses from the spectrum data comprises the processing unit being operative to remove one or more pulses that has a bandwidth or a time duration below a predetermined threshold;

extract metrics from the plurality of pulses in the spectrogram data with the wireless pulses removed; and use a Machine Learning (ML) model to determine an interferer type based upon the metrics.

11. The system of claim 10, wherein the metrics comprise durations of the plurality of pulses.

12. The system of claim 10, wherein the metrics comprise widths of the plurality of pulses.

13. The system of claim 10, wherein the metrics comprise lengths of gaps between the plurality of pulses.

14. The system of claim 10, wherein the metrics comprise variation in widths of the plurality of pulses.

15. The system of claim 10, wherein the metrics comprise densities of the plurality of pulses.

16. The system of claim 10, wherein the metrics comprise cepstral statistics that represent repeating patterns in the plurality of pulses in at least one of time and frequency.

17. The system of claim 10, wherein the metrics comprise variation in power levels of the plurality of pulses.

18. The system of claim 10, wherein the processing unit is further operative to train the ML model.

19. A non-transitory computer-readable medium that stores a set of instructions which when executed perform a method executed by the set of instructions comprising:

receiving, by a computing device, spectrogram data;

identifying time domain and frequency domain edges of a plurality of pulses in the spectrogram data;

removing wireless pulses from the spectrogram data, wherein removing wireless pulses from the spectrum data comprises removing one or more pulses that has a bandwidth or a time duration below a predetermined threshold;

extracting metrics from the plurality of pulses in the spectrogram data with the wireless pulses removed; and using a Machine Learning (ML) model to determine an interferer type based upon the metrics.

20. The non-transitory computer-readable medium of claim 19, further comprising training the ML model.

* * * * *